Oct. 31, 1967    H. LEVIN ETAL    3,349,667
AUTO-FOCUS SLIDE PROJECTOR
Filed Oct. 12, 1965
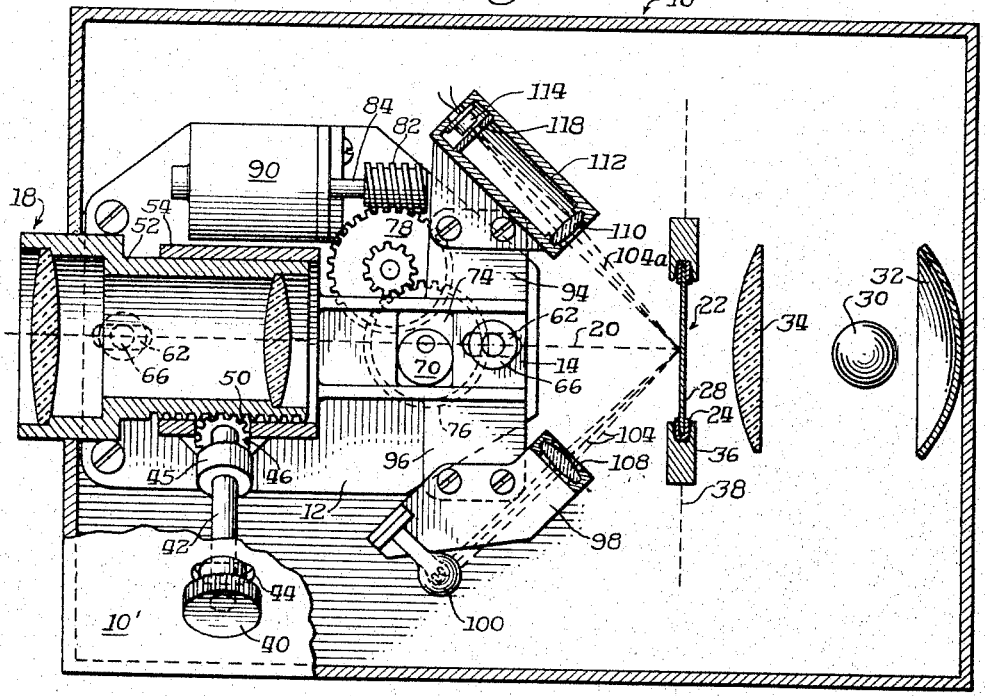
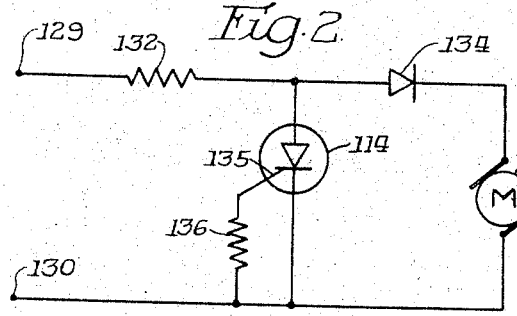
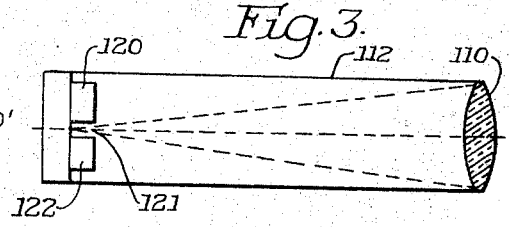
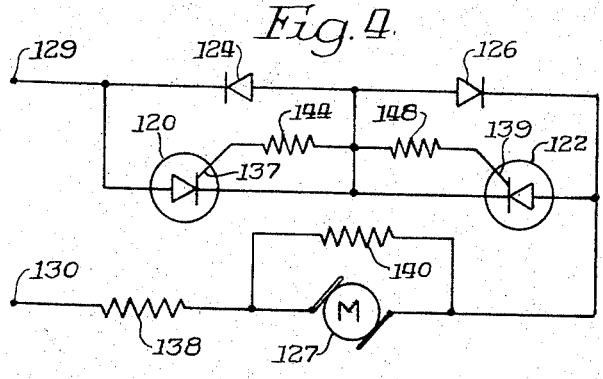
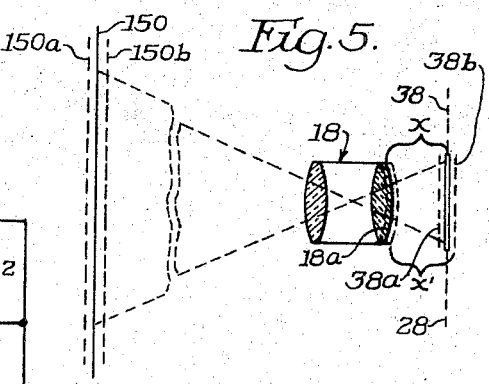
Inventors:
Herman Levin
Eric K. Maxon
By Griffin and Branigan
Attys

United States Patent Office 3,349,667
Patented Oct. 31, 1967

3,349,667
AUTO-FOCUS SLIDE PROJECTOR
Herman Levin, Glenview, and Eric K. Maxon, Palatine, Ill., assignors to Bell & Howell Company, Chicago, Ill., a corporation of Illinois
Filed Oct. 12, 1965, Ser. No. 495,072
5 Claims. (Cl. 88—26)

ABSTRACT OF THE DISCLOSURE

A slide projector focus maintaining system for sensing the movement of a slide from a position of best focus. The sensing device includes an infrared rich light source directing light rays onto the slide, which light rays are reflected from the slide relative to one (or two) light activated silicon controlled rectifiers. The light activated silicon controlled rectifier(s) is (are) operably connected in circuit to energize a motor to adjust the projector's projection lens so as to maintain constant the spacing between the lens and the slide, whereby the condition of best focus is maintained.

---

This invention generally relates to automatic focus systems for slide projectors and more specifically to an automatic focus system for slide projectors wherein the projection lens is mounted on a carriage and adapted to move relative to the slide support in accordance with an appraisal apparatus mounted on the carriage.

A slide projector automatic focus system focuses an image on a screen automatically without any manual control on the part of the operator except for an initial focus adjustment. In general, the focus of a slide projector depends upon maintaining a predetermined distance between the film which is mounted on the slide, and the projection lens. This distance, for best focus, places the film in the middle of or coincident with the focal plane of the projection lens. When "popping" occurs, which is a variation of the film from its normally flat position, the film may move out of the focal plane of the projection lens and the image projected on the screen will be out of focus. Although a conventional projection lens has a depth of focus of approximately $\frac{1}{16}$ of an inch at the focal point, the center portion of the image area of the slide may move, due to popping, a total of $\frac{3}{16}$ of an inch from one side of the initial image plane to the other side thereof. This movement is unpredictable, being caused by the heat generated by the lamp of the projector. It is apparent that correction of focus manually is generally distracting to the viewers particularly when it occurs at frequent intervals.

The prior art has suggested various solutions to the problem of popping. Among them is the automatic focusing of the slide projector by sensing the popping of the film and then utilizing a servo control means to move the slide holding mechanism in a longitudinal direction to maintain the desired relation between the slide and the projection lens. However, this system has the disadvantage that the movement of the slide relative to the projection lens requires a complicated slide loading and holding apparatus. Furthermore, it requires apparatus for maintaining the slide in a vertical position while moving it longitudinally.

Another disadvantage of this type of system resides in the complicated circuitry necessary to control the movement of the slide relative to the projection lens. In general, the sensing or appraisal system includes a light focused on the slide which is detected by a light detecting means, such as a photocell, which in turn is used to control a motor or other electro-mechanical transducer. However, the control mechanism is generally quite complicated, usually requiring the utilization of several transistors to switch the motor on or off, as desired, to change the slide position.

Another prior art method which has been suggested is to approximate the position of the image plane by appraising the position of the slide mount. However, because the image bearing material of the slide and therefore the image plane is capable of movement relative to the mount, such systems often fail to provide the desired consistent performance. Many of these systems when incorporated in projectors have required the user to mount the slide in special mounts in order to maintain uniformity in the mount selected. This necessitates the additional expense and trouble of changing presently owned slides into special and/or uniform mounts to obtain the desired result with the automatic focus system of the particular projector. Because of these requirements only one particular type of mount may be used with a particular type of projector thus requiring a user to rely upon manual focusing for other mounts not consistent with the one elected.

Accordingly, it is an object of the invention to provide a new and improved focusing system for a slide projector.

It is another object of the invention to provide a slide projector automatic focusing system wherein the projection lens is moved relative to the slide position to compensate for popping of the slide.

A further object of the invention is to provide an automatic focusing system for a slide projector which uses simple electronic circuitry to sense the slide position and control an electro-mechanical transducer for movement of the projection lens relative to the slide.

The foregoing and other objects of the invention are accomplished by mounting a projection lens on a carriage which is adapted for longitudinal movement with respect to the projection axis of the system. Also mounted on the carriage is an appraisal system which includes a light source adapted to project a point image on the slide at an angle thereto. The light imaged on the slide is reflected and detected by a light-activated silicon controlled rectifier (LASCR) which is also mounted on the carriage. The output from the LASCR is utilized by a control system which is adapted to cause the projection lens to move toward or away from the slide film causing the image to become focused on the screen. The system is de-energized when the image is in focus. Specifically, the projection lens is moved longitudinally by an eccentric cam which is coupled to a motor for movement when the motor is energized, the motor being energized when the output from the LASCR indicates that the light reflected thereto is inappropriate for the desired focus. One of the primary advantages of using a LASCR is that it can be used for direct control of the motor. Rather than utilizing a light activated switching element, such as a photocell, to energize, for example, a transistor which in turn provides power to the motor, the LASCR provides direct power to the motor for the movement of the projection lens. Consequently, the overall system is electronically simplified resulting in improved reliability.

One embodiment of the invention contemplates the utilization of one LASCR for the detection means of the appraisal system and utilizing its output to control a unidirectional DC motor. Upon the detection of a "pop" the output from the LASCR energizes the motor resulting in a continual movement of the eccentric. The movement of the eccentric will cause a forward and possibly a rearward movement of the projection lens. The motor is turned off by the LASCR when the projection lens reaches its focus position. In this embodiment when the LASCR is on the motor is off and when the LASCR is off the motor is on. A second embodiment of the invention contemplates the utilization of two LASCR's with a bi-directional DC motor being used for moving the projection lens. When the reflected light that impinges on a point between the two LASCR's the system is in focus. However, when light impinges on one LASCR the system is out of focus causing the DC motor to be energized resulting in a movement of the eccentric which in turn moves the projection lens into focus. The second embodiment is preferable to the first because it eliminates any possible hunting in the system and because it automatically causes the projection lens to move in the direction of focus whereas the first embodiment may require an almost complete cycle of the projection lens over its entire path of movement prior to reaching the focus position.

The foregoing and other objects of the present invention will become more readily understood by reference to the following detailed description when taken in conjunction with the drawings wherein:

FIG. 1 is a schematic view, partially in section, of a projector utilizing one embodiment of the LASCR detection system of the invention;

FIG. 2 is a circuit diagram of the electronic control system for the LASCR detection embodiment illustrated in FIG. 1;

FIG. 3 is a schematic view of a second embodiment of the LASCR detection system of the invention;

FIG. 4 is a circuit diagram of the electronic control system for the LASCR detection embodiment illustrated in FIG. 3; and FIG. 5 is a diagrammatic view of the principle on which the invention is made operable.

Turning now to a description of the figures wherein like reference numerals indicate like parts throughout the various views, FIG. 1 discloses a housing 10 of a projector which is fixedly attached to a base portion 12. A carriage 14 is supported on the base 12 for relatively frictionless movement. On the carriage 14 is mounted a projection lens 18 which defines a projection axis 20 along which an image from a slide 22 is projected. The carriage 14 is mounted for movement parallel to axis 20. The slide 22 comprises a mount 24 and an image support material, such as a film 28, which is held along its peripheral edges by the mount 24. Slide 22 is supported in a slide carrier 36 of the projector. The area of the image support material 28 within the periphery of the amount and particularly the central portion thereof forms the hereinafter referred to "image plane."

Illumination of the image area is provided by a projection lamp 30. Light from the lamp is concentrated by a reflector 32, passed through at least one condensing lens 34, heat absorbing glasses (not shown), the slide 22, and the projection lens 18 to project the image of the slide upon a remote surface, such as a screen. The image support material 28 is deformable and is capable of "popping" or bowing creating a convex or concave surface toward or away from the condenser 34 when heated by the air passing thereover, which air has been heated by the lamp 30. When the projector is in focus the slide carrier 36 is located so that the focal plane 38 of the projection lens 18 coincides with the plane of a slide in the carrier. This focal plane will be inherently located a predetermined distance behind the projection lens when an image from a slide is sharply focused upon a remote surface. Hence, when the focal and the image plane are coincident the projected image is at best focus.

Projection lens 18 is mounted on the carriage 14 in a manner such that it may be moved parallel to the projection axis 20 with respect to the carriage, as well as be moved by the carriage when the carriage moves. Thus, the projection lens moves longitudinally with respect to the axis 20. The movement relative to the carriage is accomplished by the operation of a focusing control member 40 which is attached to the end of a shaft 42. The shaft extends through a slot 44 in projector housing portion 10'. The slot is elongated to permit movement of the shaft 42 therein for the full range of movement of the carriage 14. The inner end of the shaft 42 extends through a bearing 45 attached to the carriage 14. A small gear 46 is permanently attached to the inner end of the shaft 42 to engage with a rack 50 formed along the exterior surface of the lens barrel 52. The barrel 52 is frictionally, although movably, retained in a caging 54 of the carriage 14. Movement of the carriage relative to the base 12 may be maintained parallel with the projection axis through any of several known means. In this preferred embodiment, the alignment and the extent of longitudinal movement of the carriage is determined by the co-operation between a pair of elongated slots 62, 62 and a pair of headed studs 66, 66 which extend into the slots. The length of these slots is slightly greater than the maximum extent which the carriage 14 may move when compensating for the "pop" of the image support material 28, as hereinafter described.

Focusing control member 40 is adapted for manual adjustment to cause movement of the projection lens 18 relative to the carriage 14 to obtain an initial best focus condition of the projected image. This movement of lens 18 establishes the predetermined relationship between the lens and the focal plane 38 such that the focal plane is made coincident with the image plane of the slide 22.

The foregoing described system is conventional and provides for conventional operation of a slide projection lens to obtain an initial focus of the image on a remote surface or screen. The present invention is hereinafter described and contemplates maintaining this focus by automatic means. The invention contemplates the powered movement to the carriage 14 in a path essentially parallel to the projection axis to maintain the focus of the lens 18 supported thereon, and is accomplished by the rotation of an eccentric 70 which extends into an elongated recess 74, preferably formed at the bottom of the carriage. The eccentric is preferably integral with a gear 76 which is driven by an intermediate speed reducing gear, such as a two-diameter gear 78. This latter gear is powered by a worm drive gear 82 which is fixedly attached to the drive shaft 84 of DC motor 90. The motor 90 is fixed to base 12. Control of the energization of the motor is through electronic circuitry as will be hereinafter described. The drive of the motor 90 is transferred through the gearing arrangement to the carriage 14 as the eccentric 70 is caused to rotate about the axis of rotation of gear 76. The eccentric engages the forward and rearward wall portions of recess 75 to cause the carriage to be rectilinearly reciprocated in a cyclical manner as guided by the slots 62 and the studs 66. The eccentricity of the eccentric 70 is sufficient to move the carriage in excess of the range through which the image support material 28 will "pop." Hence, the foregoing mechanical system when controlled in an appropriate manner, as hereinafter described, is adapted to move the projection lens from an out of focus position into a focus position.

Turning now to the appraisal and control system of the invention, extending from the carriage 14 are a pair of arms 94 and 96 supporting components of the image plane position appraisal system. Each of these arms extends at an angle relative to the projection axis 20. Supported by a plate 98, which may be mounted for adjustment on arm 96, is a sensing or appraisal lamp 100 producing a beam of light rays 104. For reasons hereinafter set forth these rays are preferably relatively rich in infrared radiation. A condensing lens 108 is mounted on the plate 98 in the path of the light rays 104 causing them to focus at a point approximately at the center of the slide image area 28. These rays are then reflected as rays 104a through a second condensing lens 110 mounted at one end of the generally tubular enclosure 112 which is attached to arm 94. The condensing lens 110 causes the reflected light rays 104a to again come to a point of focus. The point of focus upon which the reflected light rays impinge is a light activated silicon controlled rectifier (LASCR) 114 located at the opposite end of the enclosure 112.

Located within the enclosure 112 and just ahead of the LASCR surface is a ring-like baffle 118 which serves to limit the angle from which the light rays can impinge upon the LASCR. The effectiveness of the invention is enhanced because in addition to its other advantages the LASCR is highly sensitive to infrared rays of the light spectrum yet relatively non-sensitive to light in the visible range. The combination of these features and the mounting of the cell behind the baffle 118 within the enclosure 112 reduces to a minimum the effect upon the LASCR of extraneous light from the projection lamp 30, as dispersed by the image support material 28. The light from the projection lamp is relatively weak in infrared radiation due to the presence of heat filters along the projection axis between the slide 22 and the lamp 30.

FIG. 2 discloses the electronic control system utilized with the LASCR detector set forth above and includes the LASCR as one of its elements. The control circuit is designed to energize the DC motor 90' by selectively connecting it to a power source. The incoming power is applied to a pair of terminals 129 and 130. Connected to the terminals 129 and 130 is a series combination of a resistor 132, a forward biased diode 134 and a unidirectional DC motor 90'. The anode of a LASCR 114 is connected between the junction of the resistor 132 and the diode 124. The cathode of the LASCR 114 is connected to the terminal 130. The gate 135 of the LASCR is connected through a resistor 136 to the terminal 130.

The circuit operates as follows. As long as the LASCR is turned off, i.e., no light is impinging on it, all current flows through the series circuit including 132, 134, and 90' and the motor 90' turns in its unidirectional direction. However, when light of sufficient intensity impinges on the LASCR 114 it is turned on, thereby shorting out the motor 90' and turning it off. Hence, this embodiment of the invention will be in focus on the remote surface with the image support means 28 (FIG. 1) being coincident with focal plane 38 when reflected light impinges on the LASCR 114. However, when the image support means 28 "pops" the reflected light will not impinge on the LASCR 114 and, upon the first negative excursion of the input voltage, it will be turned off, thereby turning the motor 90' on and causing the eccentric 70 to revolve. This causes the projection lens 18 to move longitudinally back and forth. When the projection lens 18 reaches the point of focus the light reflected by the image forming means 28 will again be reflected so as to impinge on the LASCR 114 thereby turning off the motor. It will be apparent to one skilled in the art that only AC power can be utilized in this embodiment of the invention since the negative excursions of the AC signal are necessary to reverse bias the LASCR and turn it off when light is not impinging on it. When the AC power is utilized the action of the diode 134 will pass current in one direction but block it in the other direction thereby providing pulsating DC to the motor 90'. Hence, the overall system is an automatic focusing means for slide projectors.

An alternate embodiment of the invention is shown in FIGS. 3 and 4, and like FIG. 1 includes an enclosure 112 and a condensing lens 110 for imaging reflected light on a LASCR system. However, the embodiment of FIGS. 3 and 4 employs two LASCR's 120 and 122. In this embodiment the reflected light from the slide 22 is directed so that it impinges on one or the other of the two LASCR's 120 and 122 when the projector is out of focus due to "popping" and impinges on a dead zone 121 between the LASCR's when the projector is in focus. The dual LASCR detector and control is electronically connected as illustrated in FIG. 4. An external source of power is provided to the circuit at terminals 129 and 130. Connected between the terminals in a series circuit are a pair of back-to-back diodes 124 and 126, a bi-directional DC motor 127, and a resistor 138. Connected in parallel with the motor is a second resistor 140 for transient suppression. The first LASCR 120 is connected in parallel with diode 124 but poled in the opposite direction thereto. A resistor 144 is coupled between the gate 137 of the first LASCR 120 and the junction between the diodes 124 and 126. Connected in parallel with the second diode 126 but oppositely poled is the second LASCR 122. A resistor 148 is connected between the gate 139 of the second LASCR 122 and the junction between the diodes 124 and 126.

When the focal plane 38 is coincident with the image plane the reflected light impinges on the dead zone 121 located between the two LASCR's 120 and 122. Consequently the LASCR's are not energized and, due to the blocking action of the pair of back-to-back diodes 124 and 126, the motor is not energized. However, when a "pop" occurs the reflected light rays move from the dead zone 121 and impinge on one or the other of the two LASCR's 120 and 122 depending upon the direction of "pop." When light rays impinge on a LASCR it is turned on providing a low resistance path to current flow. Hence, if, for example, the film "pops" and light impinges on LASCR 120 a current path exists from terminal 129, through LASCR 120, through diode 126, through the motor 127, through resistor 138 to the other terminal 130. In this manner, the motor is energized to revolve in one direction. Conversely, if the other LASCR 122 were energized the current flow would be in the opposite direction, through LASCR 122 and 124, causing the motor 127 to revolve in the opposite direction. It will be apparent to one skilled in the art that the current applied to the terminals 129 and 130 is AC, however, due to the action of the diodes only pulsating DC is applied to the motor.

As in the first described embodiment of the invention, the operation of the motor 127 causes the eccentric to turn which in turn moves the projection lens in a longitudinal direction. However, due to the electrical interconnections of the circuit shown in FIG. 4, the longitudinal movement of the projection lens is in the direction of focus. Hence, the overall system is an automatic focusing apparatus which has bi-directional movement eliminating any hunting effect which might be created in a system incorporating the previously described embodiment. However, this improvement in performance is at the cost of an increased circuit complexity and the utilization of additional components.

FIG. 5 shows the interrelationship between the image plane 28, the focal plane 38, the lens 18 and a remote surface 150 such as a screen. When the lens 18 is focused the focal plane 38 of the lens is coincidental with the image plane 28 and the projected image is focused upon the remote surface 150. When the support material "pops" it causes the effective image plane to be moved to one of the dotted line positions 38a and 38b. Specifically, the popping alters the predetermined distance X between the lens and the image plane. The location of focus of the projected image is then 150a or 150b, if lens 18 is maintained in focus of the projected image be located at 150 the predetermined distance X between the lens and the image plane must be regained. This can be accomplished by moving the lens 18 along its axis of projection until its focal plane 38 is again coincident with the image plane 28.

The foregoing described automatic focus system accomplishes this result.

The appraisal system, which includes the lamp 100, and the LASCR detection system determines when the image forming means 28 has "popped" and generates an indicative output of this condition. This output is then utilized by a simple electronic control system to energize a motor. When the motor is energized it causes eccentric 70 to revolve which in turn causes the projection lens 18 to move in a longitudinal direction to bring the projected image back into focus. Hence, the objects of the invention have been accomplished by the provision of an electronically simple system to sense "popping" and to automatically refocus the slide projector.

Although a specific embodiment of the invention has been shown and described, it is to be understood that modifications and variations of the invention may be performed without departing from the spirit and scope of the invention as set forth in the appended claims.

The embodiments of the invention in which an exclusive property or privilege is claimed are defined as follows:

1. Apparatus for the automatic focusing of a slide projector to compensate for "popping" of the film during projection wherein the film is illuminated from a light source and is projected along a projection axis by a projection lens with its focal plane located at the film plane comprising:
   light means adapted for movement with the projection lens for directing a constant light beam onto the film along an axis at an angle to the normal film plane to be constantly reflected from the film along an axis whose position changes with the changes of film position;
   light detecting means including one light activated silicon controlled rectifier also adapted for movement with the projection lens for intersecting said reflected light and for generating an output which is representative of the light intersected;
   unidirectional DC motor means connected in parallel with said light activated silicon controlled rectifier, operably connected to the projection lens, and adapted to move said projection lens in a longitudinal direction parallel to the projection axis of the projector thereby shifting the focal plane of the projection lens to bring it into coincidence with the film plane; and
   control means electrically connected to the output of said light detecting means for controlling said unidirectional DC motor means.

2. Apparatus as claimed in claim 1 wherein said light means comprises a source of infrared light.

3. Apparatus as claimed in claim 2 wherein said control means comprises:
   a resistor;
   a diode;
   said diode being connected in series with said unidirectional DC motor;
   said light activated silicon controlled rectifier being connected in parallel with said unidirectional DC motor for shorting said unidirectional DC motor when said light activated silicon controlled rectifier is energized; and
   said resistor being connected between the gate and the cathode of said light activated silicon controlled rectifier.

4. Apparatus as claimed in claim 3 including a current limiting resistor connected in series with the parallel light activated silicon controlled rectifier and motor combination.

5. Apparatus for the automatic focusing of a slide projector to compensate for "popping" of the film during projection wherein the film is illuminated from a light source and is projected along a projection axis by a projection lens with its focal plane located at the film plane comprising:
   light means including a source of infrared light adapted for movement with the projection lens for directing a constant light beam onto the film along an axis at an angle to the normal film plane to be constantly reflected from the film along an axis whose position changes with changes of film position;
   light detecting means including a pair of light activated silicon controlled rectifiers also adapted for movement with the projection lens for intersecting said reflected light and for generating an output which is representative of the light intersected, said light activated silicon controlled rectifiers mounted in such a manner that they are off when said film is in its normal position and one of said pair is on when the film is "popped";
   electro-mechanical transducer means including a bi-directional DC motor and an eccentric cam rotated by said bi-directional DC motor and adapted for operation with the projection lens to move said projection lens in a longitudinal direction parallel to the projection axis of said projector thereby shifting the focal plane of said projection lens to bring it into coincidence with the film plane; and
   control means comprising first and second diodes, said first diode, said second diode and said bi-directional DC motor connected in series with said first and second diodes connected in a back-to-back relationship, one of said pair of light activated silicon controlled rectifiers connected in parallel with said first diode and poled in the opposite direction thereto, and the second of said pair of light activated silicon controlled rectifiers connected in parallel with said second diode and poled in the opposite direction thereto.

References Cited
UNITED STATES PATENTS

| 3,037,423 | 6/1962 | Shurcliff | 88—26 |
| 3,205,766 | 9/1965 | Ewald et al. | 352—140 |
| 3,263,558 | 8/1966 | Golden | 352—140 |
| 3,264,935 | 8/1966 | Vose | 352—140 |

NORTON ANSHER, *Primary Examiner.*

R. M. SHEER, *Assistant Examiner.*